United States Patent [19]

Canziani

[11] Patent Number: 4,815,582

[45] Date of Patent: Mar. 28, 1989

[54] FEEDING APPARATUS PARTICULARLY FOR MACHINES FOR THE CONVEYANCE AND SORTING OF OBJECTS

[76] Inventor: Francesco Canziani, Via Contardo Ferrini 21, San Macario (Varese), Italy

[21] Appl. No.: 844,116

[22] Filed: Mar. 26, 1986

Related U.S. Application Data

[63] Continuation-in-part of Ser. No. 435,624, Oct. 20, 1982, abandoned, and a continuation-in-part of Ser. No. 500,255, Jun. 2, 1983, abandoned.

[30] Foreign Application Priority Data

Dec. 24, 1981 [IT] Italy .............................. 25859 A/81
Jun. 11, 1982 [IT] Italy .............................. 21834 A/82
Jul. 21, 1982 [IT] Italy .............................. 22482 A/82

[51] Int. Cl.$^4$ .......................................... B65G 37/00
[52] U.S. Cl. .................................. 198/365; 104/119; 198/572; 209/914; 209/942
[58] Field of Search ............... 209/630, 610, 695, 914, 209/942, 539, 559; 198/365, 572; 104/118–120, 48, 146; 364/478

[56] References Cited

U.S. PATENT DOCUMENTS

| | | | |
|---|---|---|---|
| 3,231,066 | 1/1966 | Harrison et al. | 198/365 |
| 3,231,068 | 1/1966 | Harrison et al. | 198/365 |
| 3,451,525 | 6/1969 | Greller | 198/365 |
| 3,550,535 | 12/1970 | Rooklyn | 104/118 |
| 3,550,748 | 12/1970 | Hauer | 198/365 |
| 3,912,071 | 10/1975 | Nielsen | 198/365 |
| 3,982,625 | 9/1976 | Wentz et al. | 198/572 |
| 4,096,936 | 6/1978 | Nielsen | 198/365 |
| 4,450,073 | 5/1984 | Burnett et al. | 198/365 |
| 4,604,704 | 8/1986 | Eaves et al. | 364/478 |
| 4,610,359 | 9/1986 | Muller | 209/939 |

OTHER PUBLICATIONS

Alvey, Inc., "Lower handling costs", 1982.
Alvey, Inc., "How to sort accurately" no date.
Kosan Crisplant als, "Postal Centers Tilt-Tray Sorting" no date.
Logan Fenamec, "Sortation Systems", 1986.
Tissmetal Lionel. DuPont, (T.L.D.), "Gull Wing® Carrousel Sorting System" no date.

Primary Examiner—Johnny D. Cherry
Assistant Examiner—Donald T. Hajec
Attorney, Agent, or Firm—Ladas & Parry

[57] ABSTRACT

An apparatus for feeding, selecting and sorting has a coding and feeding unit, a sorting machine and a synchronizing unit. The coding and feeding unit has a keyboard for keying in codes of respective unloading-station destinations of respective items thereat and conveys the items from the keyboard. The sorting machine has a monorail of T-shaped cross section, a plurality of conveying devices for conveying respective items in one direction along the monorail, a chain for moving the conveying devices along the monorail in the one direction one after the other, and pairs of feed rods spacedly parallel to each other, the pairs of feed rods being spaced along the monorail for defining an unloading station at each pair of the feed rods therealong and spaced from the monorail for sliding contact with slidable contacts of each conveying device as it moves therepast along the monorail in the one direction. Each conveying device has at least two pairs of idle wheels with substantially horizontal axes supporting the conveying device on the monorail for movement in the one direction therealong, at least one pair of idle wheels with substantially vertical axes for guiding the conveying device along the monorail in the one direction, a pair of rollers and a rotary belt thereabout for receiving the respective item of the conveying device and unloading the item by rotary movement of the belt transverse to the one direction, a permanent magnet D.C. electric motor for rotating the rotary belt, and the pair of slidable contacts connected to the motor. The synchronizing unit successively receives the items from the coding and feeding unit and feeds them respectively to the conveying devices. For this, the synchronizing unit has three rotating belts positioned one after the other, the speed of the rotation of the three rotating belts being controllable independently of one another.

2 Claims, 10 Drawing Sheets

FEEDING APPARATUS PARTICULARLY FOR MACHINES FOR THE CONVEYANCE AND SORTING OF OBJECTS

This is a continuation-in-part of copending U.S. patent applications Ser. Nos. 435,624 and 500,255 filed on Oct. 20, 1982 and June 2, 1983, respectively, and now both abandoned.

BACKGROUND OF THE INVENTION

1. Filed Of The Invention

The present invention relates to a directing device, for feeding, selecting and sorting objects, of the type having a series of planar conveying devices pulled along a fixed path and able to unload objects carried thereon at predetermined unloading stations. Each conveying device has a small, rotary, planar-belt, object-carrying conveyor powered by an electric motor, preferably D.C. A special characteristic of the device according to the invention is the possibility of controlling each small belt conveyor independently of all the others and in a manner commanding belt rotation in one or the other direction at a selected speed, as unloading requires. Another characteristic of the device according to the invention is that the conveying devices can move along paths curving in horizontal or vertical planes.

2. Description Of The Prior Art

Directing devices are well known, such as those used in large post offices to sort mail, or in mail order companies, or wherever there is a need to select and distribute a large number of products which can differ in bulk, weight, and collection point. Some of these devices consist of continuous-belt conveyors with deviators or similar devices therealong controlled by electromechanical devices to unload objects carried on the continuous-belt conveyors. Other devices consist of a series of platforms carried along a fixed path and interactive with devices which cause them to tilt for the unloading operation as required.

These known devices have substantial limitations. Some cannot follow irregular paths. Others unload all the objects carried in the same way, which is a big operational limitation.

In the latter case, for example, where the device serves a number of machine tools, the limitation is especially substantial. Each machine tool has to be fed objects at a quite specific rhythm according to the machining operation the machine tool performs, and as a consequence, the workpieces must reach the machine tools at intervals which differ from machine tool to machine tool. Consequently, for example, separate belt conveyors have been used to carry workpieces to respective machine tools at different intervals, preferably correlated to the speed of the belt itself.

The utility of a device that permits objects to be unloaded at different intervals, depending on the unloading station, or even at the same station, therefore appears clear.

There are brochures illustrating directing-device systems produced by the ALVEY, CRISPLANT, LOGAN AND TISSMETAL T.L.D. companies. The market for directing-device systems is quite limited and, among the therefore-non-numerous companies supplying this market, those cited above are most representative.

The system produced by ALVEY is made up of a roller conveying surface along a fixed path. At unloading stations, the conveying surface is crossed, transversely, by mechanically-operated pushers, for discharging roller-conveyed objects.

The system produced by CRISPLANT is made up of a series of small, object-carrying tilting trays down along a fixed path. As they pass an unloading station, the tilting trays are mechanically tilted by an electromagnetically-controlled cam.

The system produced by LOGAN is made up of object-carrying tilting trays drawn along a fixed path and tilted by an electro-pneumatic cam.

The system produced by TISSMETAL T.L.D. is made up of a series of small, object-carrying tilting trays on two tilting frames drawn along a fixed path. An electro-pneumatic device actuates one of the two tilting frames of each tray.

The former thus utilize tilting trays or a continuous conveyance surface as conveyed elements, and not small rotating belts. The latter feature, together with the adoption of permanent-magnet D.C. motors could provide remarkable advantages, especially due to the high speed and acceleration performances of the motors, particularly if controlled by a computer. With suitable sensors (photoelectric cells), it would be possible to check the position of the items to be discharged continuously and with maximum precision and, therefore, to operate the system members (i.e. the motored small rotating belts), via a computer, with high performance. The system members could discharge items at a high speed to make it possible to adopt sorting windows (i.e. unloading stations) of minimum dimensions and to place them side by side, thus attaining considerable space-saving and the ability to handle a larger number of items. This cannot be obtained with the above-described mechanically-operated systems of the prior art due to the acceleration and speed requirements, which cannot be met due to the need to reduce wear and tear on their systems.

U.S. Pat. No. 3,912,071 discloses a sorting system in which each of a series of item conveyors has a small rotating belt for mechanical operation by devices at the discharging points (i.e. unloading stations).

The patent also considers the possibility of operating the small rotating belts with electric motors on carrier units of the item conveyors. The kind of motor is not specified, however, and the patent does not suggest the use of permanent magnet D.C. motors.

SUMMARY OF THE INVENTION

It is, therefore, one of the principle objects of the present invention to solve the problems described with a series of planar conveying devices pulled along a fixed path, each conveying device having a rotary belt powered by a permanent magnet D.C. electric motor.

The present invention is in a system made up of equipment for coding the system according to items to be sorted, feeding-in the items, synchronizing the items to the system, conveying the items, and sorting the items into unloading stations according to the coding.

The system is controlled by a central computer unit. The coding equipment therefore includes a keyboard by which an operator keys-in a code of the unloading-station destination of each item then on a feeding-in rotating belt. The code is stored in the central computer unit. The computer unit then operates the feeding-in rotating belt at the appropriate time to discharge the item onto a main or link conveyor belt leading to the sorting machine, e.g. conveying devices.

The operational speed and time of operation of the feeding-in rotating belt varies based upon the size of the item, and is so controlled by appropriate sensors.

The synchronizing equipment includes three, small, synchronizing rotating belts in series, one after the other. They receive the items from the main conveyor belt and discharge the items onto the planar surfaces of respective conveying devices of the sorting machine. The three synchronizing belts are independent, have a variable speed which is constantly controlled by the central computer unit, and accelerate or decelerate the item being conveyed to synchronize it with the movement of the conveying devices of the sorting machine, so that the item is placed centrally on the planar surface of a conveying device of the sorting machine. A series of photoelectric cells checks the positions of the incoming items and sends signals to the computer for the necessary speed variations of the belts.

The sorting machine includes a series of carrier units (i.e. conveying devices) drawn along a fixed path by a chain. Each carrier unit has a small rotary-belt conveyor with a planar upper run movable orthogonally to the direction the carrier units are drawn along the path. The items to be sorted are discharged from the last of the series of synchronizing belts onto the upper runs of respective ones of these small rotary belts, which are at internals appropriate to ensure this, as previously described.

Thereafter, when a carrier unit has been drawn to an unloading station, the item thereon is unloaded into a collecting hopper. In the invention, the collecting hoppers are side by side, on both sides of the path of the carrier units through the sorting machine. The width of each collecting hopper is approximately equal to the width of the small rotary belts that carry out the discharge operation.

For the discharge operation, each small rotary belt is operated by an electric motor on its carrier unit. Power for the electric motor is supplied by contacts on the carrier unit sliding on "live tracks", i.e. feed rods, placed along the path at each unloading station. An encoder is connected to pulling devices for the chain. Thus, the encoder generates impulses which inform the central computer unit constantly of the position of each carrier unit. When it is time to discharge an item, i.e. when the carrier unit with the item has reached the unloading station for the item, the computer unit gives the "live tracks" at the unloading station the voltage necessary to operate the motor on the carrier unit to rotate the small rotary belt, thus discharging the item.

The latter, and also the motors for the synchronizing and feeding-in belts, are permanent-magnet D.C. motors.

In one embodiment of the present invention, each carrier unit has a frame, which is supported by idle wheels on a monorail and pulled along the monorail by a chain powered, for example, by an electric motor. Pairs of the feed bars are placed parallel to the monorail. Sliding contacts on the carrier units run on these bars for providing the power for the motors which drive the small rotary belts.

The pairs of feed bars are at respective unloading stations, each independent from the others. This permits the power supplied to each motor to be varied, permitting unloading to be done on either side of the monorail at the required speed, by simply inverting the power-supply polarity or varying its voltage.

It is another object of the invention to avoid the aforementioned drawbacks of the prior-art proposals.

Further objects and advantages of the invention will be set forth, in part, in following specification and, in part, will be obvious therefrom without being specifically referred to, the same being realized and obtained as pointed out in the claims hereof.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENTS

Figure 1:
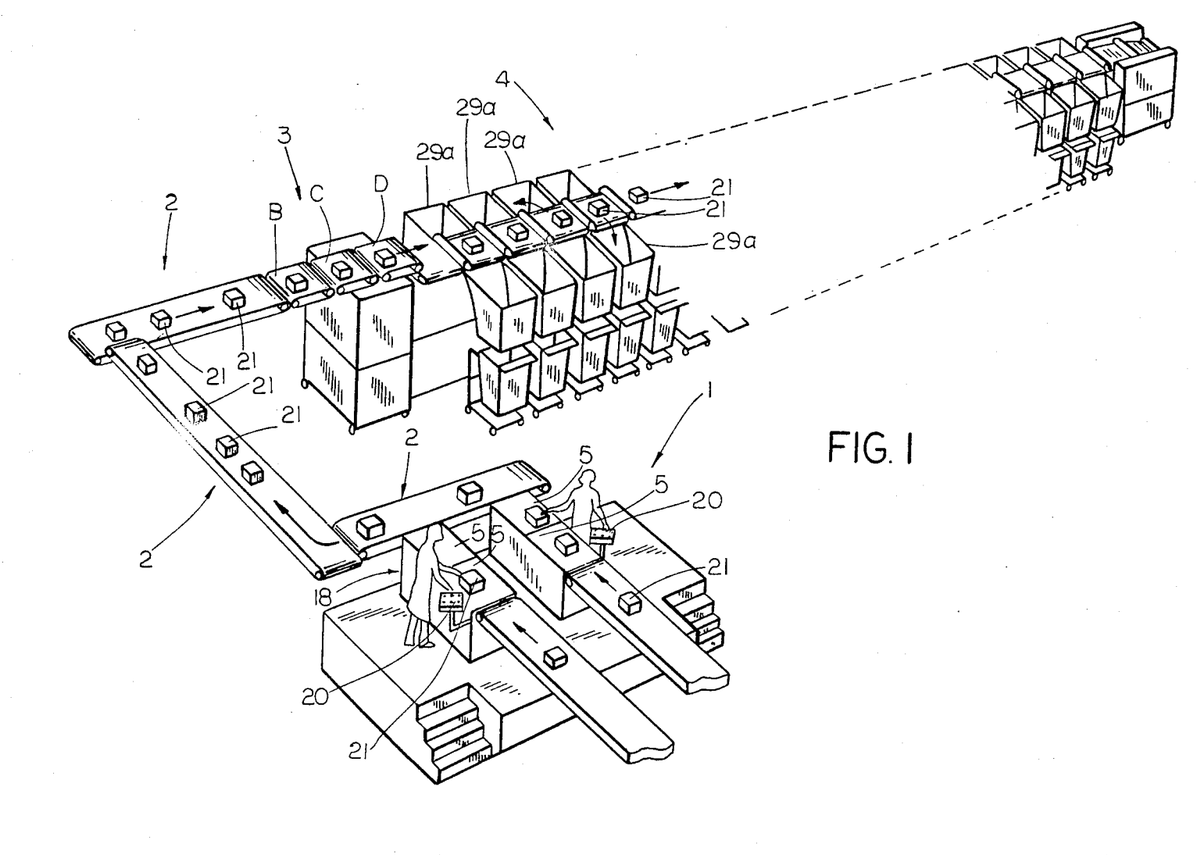
FIG. 1 is a general view of apparatus according to the invention.

Referring now to the drawings and, in particular, FIG. 1, the apparatus comprises a feeding device in a loading and codifying area indicated by 1 and one or more link belts at 2 directed to a synchronizing device at 3 and, from there, to a sorting machine 4.

All of the illustrated devices are controlled by a central computer unit (not shown) located outside the apparatus.

The feeding device (FIGS. 1–5) comprises two or more feeding elements at 18, each having a feed-in belt 5. Each belt 5 is mounted on rolls 6, kept under tension by a couple of rolls 7 pressed against the belt by springs 8, and driven by a roll 9 actuated by a motor 10 of permanent magnet D.C. type. The rolls 6 extend beyond supporting frameworks 11 therefor in the axial direction of the belts 5 in order to allow continuous transport of objects 21 (FIG. 1) to be sorted. Frameworks 11 are mounted on adjustable supports 12.

The feeding device according to the invention may also be provided with a head element at 19 (on the left in FIG. 2) suitable for setting the feeding device at an angle in respect of the adjacent one of the link belts at 2. This element consist of a base 13 supporting a feeding-in belt 14 on two pairs of rolls 15—15' and 16—16' placed the one on top of the other. The rolls 16 and 16' are inclined at the angle to the rolls 15—15' and, between them, there is interposed a stretching roll 18a at an angle to the rolls 15—15' which is opposite and twice as great as that formed by the rolls 16 and 16'. A motor 10' drives one of the rolls 15—15' to rotate the belt 14.

Figure 2:
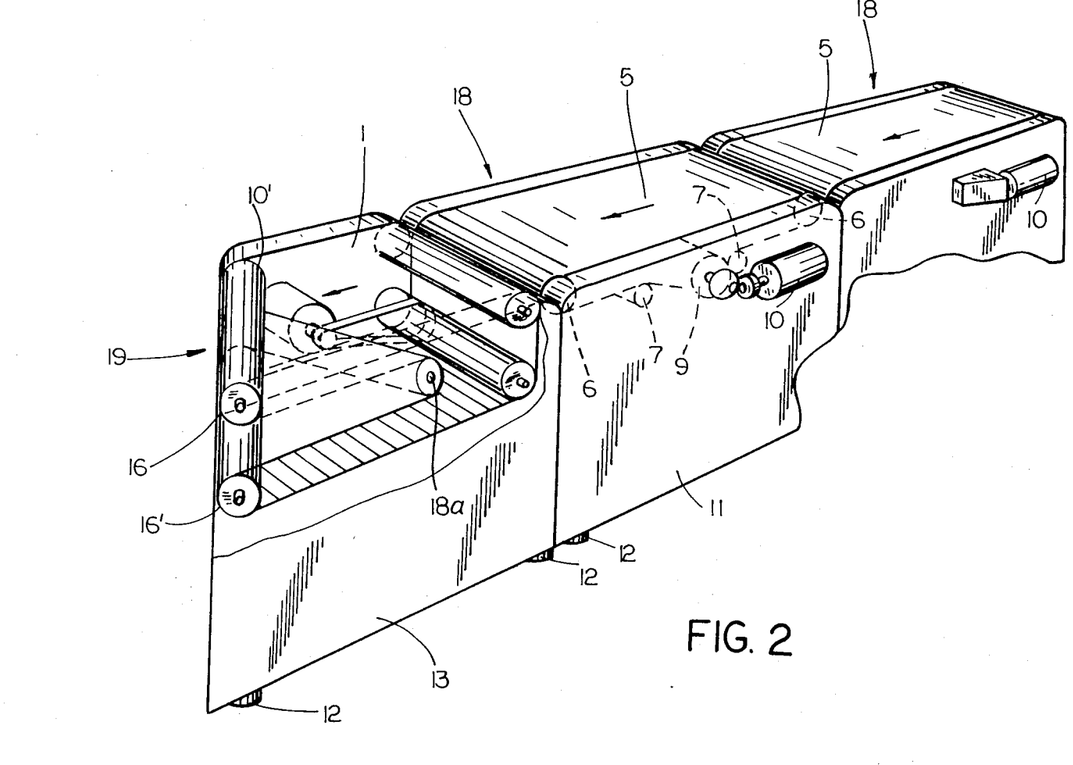
FIG. 2 is a partially cut-away perspective view of a feeding device of another apparatus according to the invention.
Figure 3:
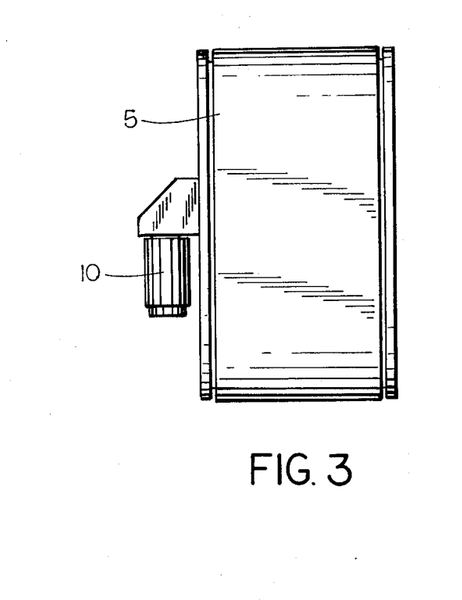
FIG. 3 is a top view of an element of the feeding device of FIG. 2.
Figure 4:
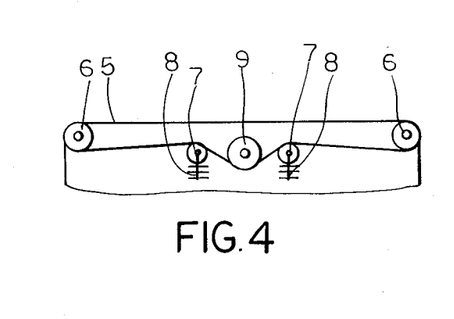
FIG. 4 is a lateral, schematic, section view of a portion of the element of the feeding device of FIG. 3.
Figure 5:
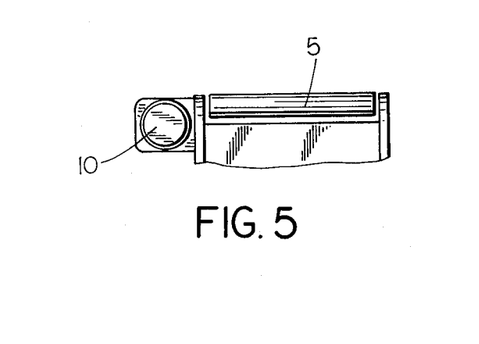
FIG. 5 is an end view, orthogonal to that of FIG. 4, of the portion of the element of the feeding device of FIG. 3.
Figure 6:
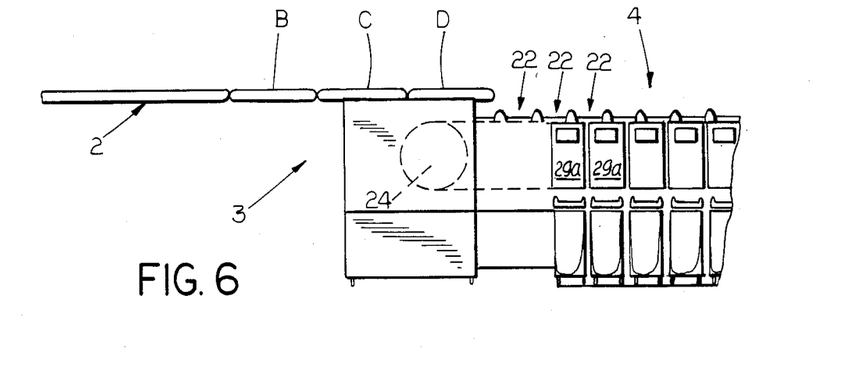
FIG. 6 is a lateral view of a synchronizing device of the apparatus of FIG. 1.
Figure 7:
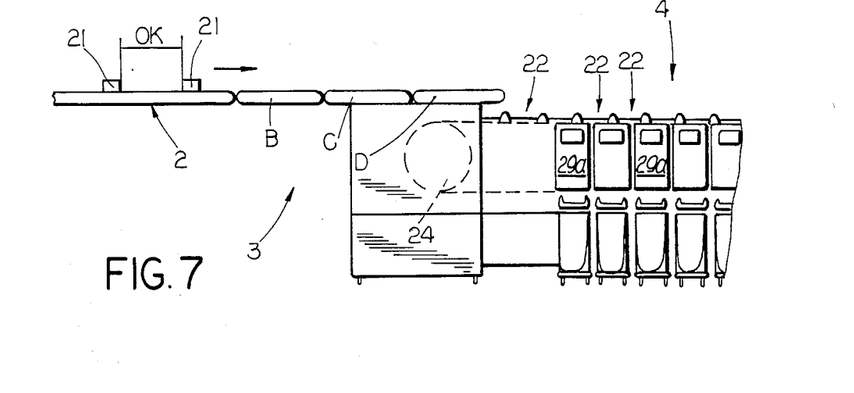
FIG. 7 is another lateral view of the synchronizing device of FIG. 6 sorting two items perfectly spaced apart on a link belt therefor.
Figure 8:
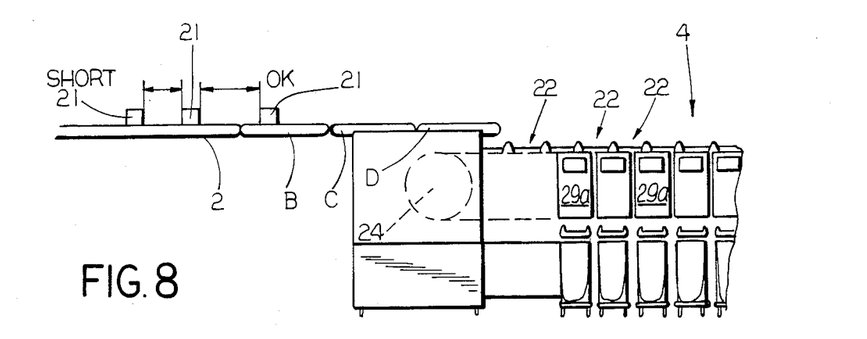
FIG. 8 is another lateral view of the synchronizing device of FIG. 6 sorting three items, one of which is located at a distance from the preceding one that is less than desired while, in this moment, all the items are carried at the same speed $V_O$.
Figure 9:
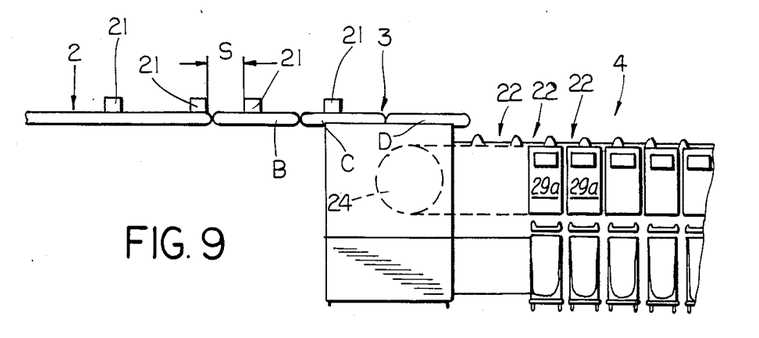
FIG. 9 is another lateral view of the synchronizing device of FIG. 8, showing the one item arriving at the end of the link belt.
Figure 10:
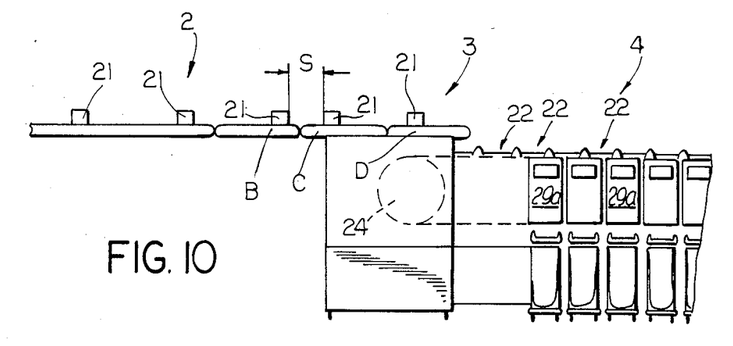
FIG. 10 is another lateral view of the synchronizing device of FIG. 8, showing that as soon as the preceding item leaves one belt of the synchronizing device, said belt has an immediate deceleration, to about for instance 40% of the rated speed, for a period set by a computer unit on the basis of its displacement of the one item with respect to its synchronizing position, and then returns to its standard speed to end the correction.
Figure 11:
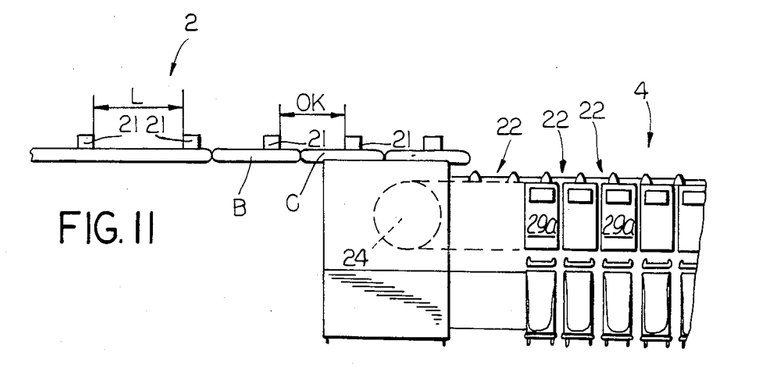
FIG. 11 is another lateral view of the synchronizing device of FIG. 8, showing how the one item has been taken back to its correct position and another item, on the link belt, delayed with respect to its synchronized position.
Figures 12, 13:
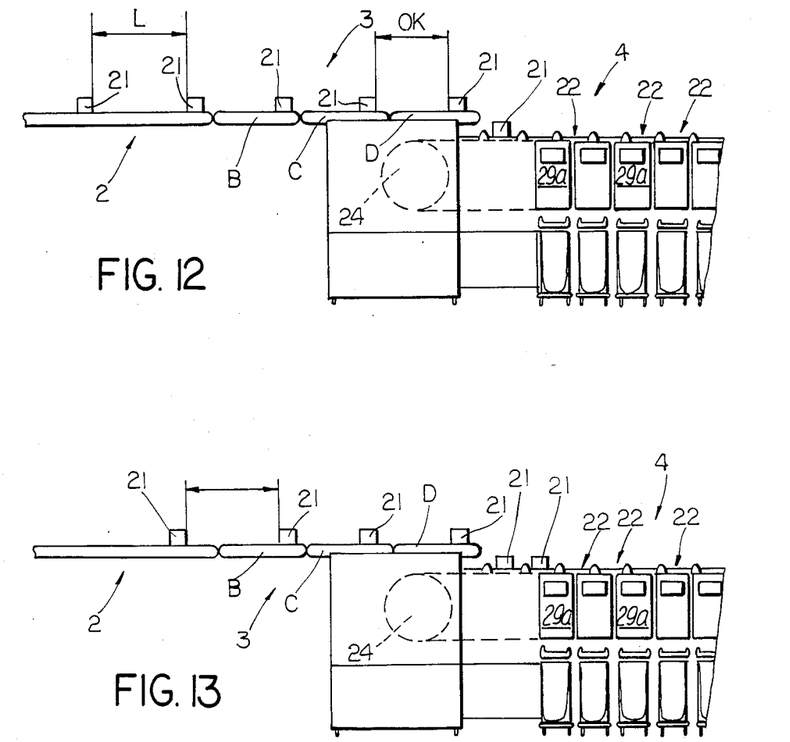
FIG. 12 and 13 are still other lateral views of the synchronizing device of FIG. 8, showing how the other, delayed item and a following one initially proceed towards the sorting machine without varying the distance therebetween.
Figure 14:
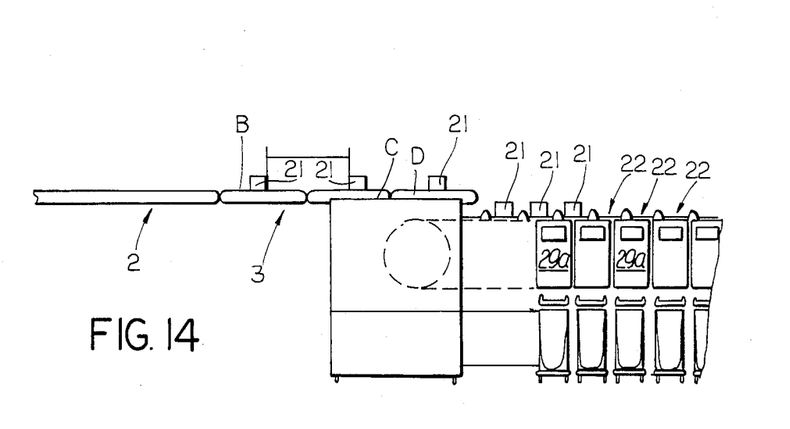
FIGS. 14 and 15 are still other lateral views of the synchronized device of FIG. 8, showing how the link belt accelerates its speed, for a period set by the computer unit according to the distance to recover, as soon as the preceding item leaves the synchronizing device.
Figures 15, 16:
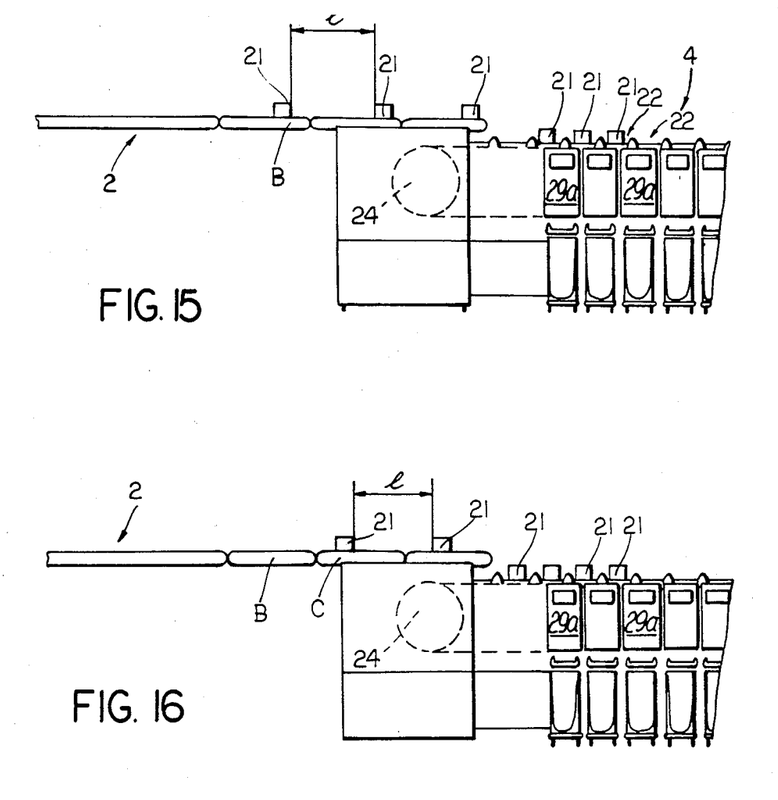
FIG. 16 is another lateral view of the synchronizing device of FIG. 8, showing how acceleration is repeated on the link, because the item was not in time to regain the delay.
Figure 17:
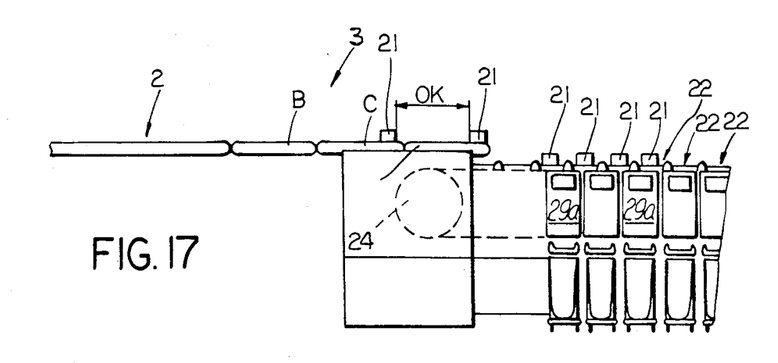
FIG. 17 is another lateral view of the synchronizing device of FIG. 8, showing the item in its correct position.

The motors 10, 10' that actuate the belts 5 and 14 are preferably of the permanent magnet d.c. type to have an extremely rapid acceleration and easy speed adjustment by the computer unit. In this manner, it is possible to eliminate noisy mechanical transmission devices, and to achieve, at the same time, smooth functioning and a quick response. In particular, it is possible to adjust the speed of the belts 5 and 14 as a function of the size of the items to be sorted, so that the items are properly disposed on the link belts at 2.

Thus, if the feeding device is to be set orthogonally in respect of the first adjacent main or link conveying belt at 2, as in the embodiment of FIG. 1, the feeding device is made up of a series of just elements 18, but if, instead, an angular arrangement is required, a head element 19 (FIG. 2) is also used.

Referring now to FIG. 1, and the codifying area at 1 thereof, in particular, there are a number of push-button keyboard panels 20 through which the operator keys in sorting machine destination codes for items 21 to be sorted. These items are then placed on one of the feeding devices consisting, first, of one of the belts 5. The feeding device, as operated by the computer unit, then unloads, the items 21 at suitable moments onto the first of the link belts at 2.

The link belts then carry the items to the synchronizing device at 3. It consists of a series of synchronizing rotating belts B, C, and D, respectively, each independent of the other and capable of rotating at different speeds, as controlled by the computer unit.

Photocells (not shown) are operatively associated with each of the synchronizing belts. These make it possible to check the arrival of the items 21 and the distance between them.

Once synchronized, as shown in FIGS. 6 to 18, the synchronizing device delivers the items 21 to the sorting machine at 4.

Figure 18:
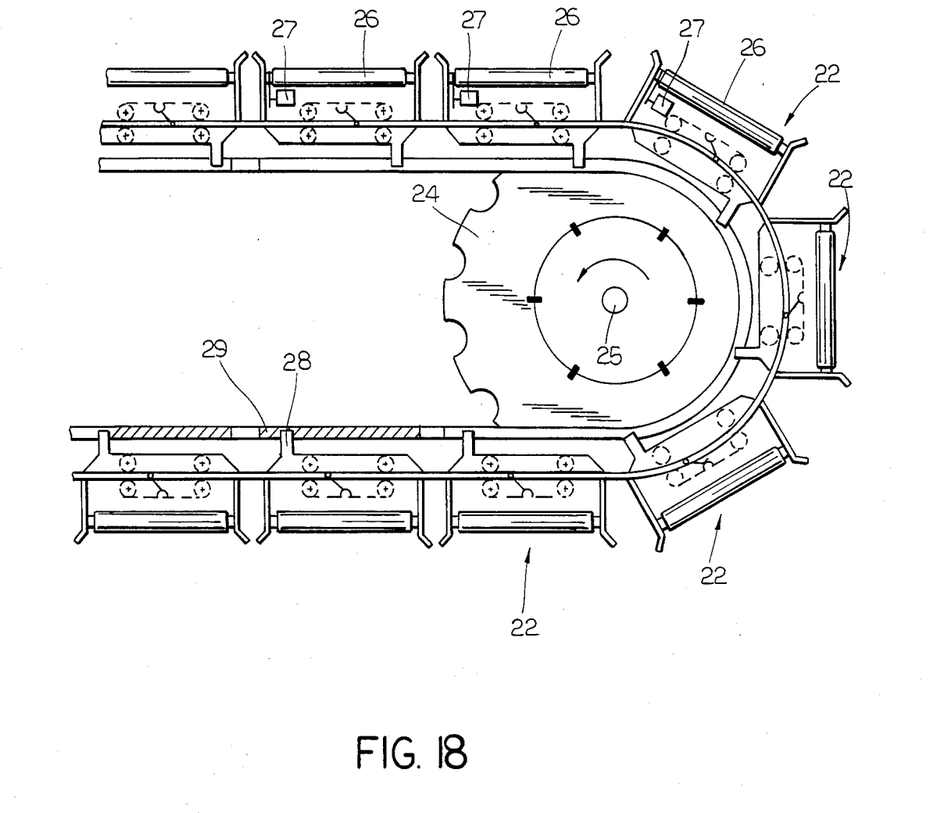
FIG. 18 is a lateral, i.e. side view of a portion of a sorting machine of the apparatus of FIG. 1.
Figure 19:
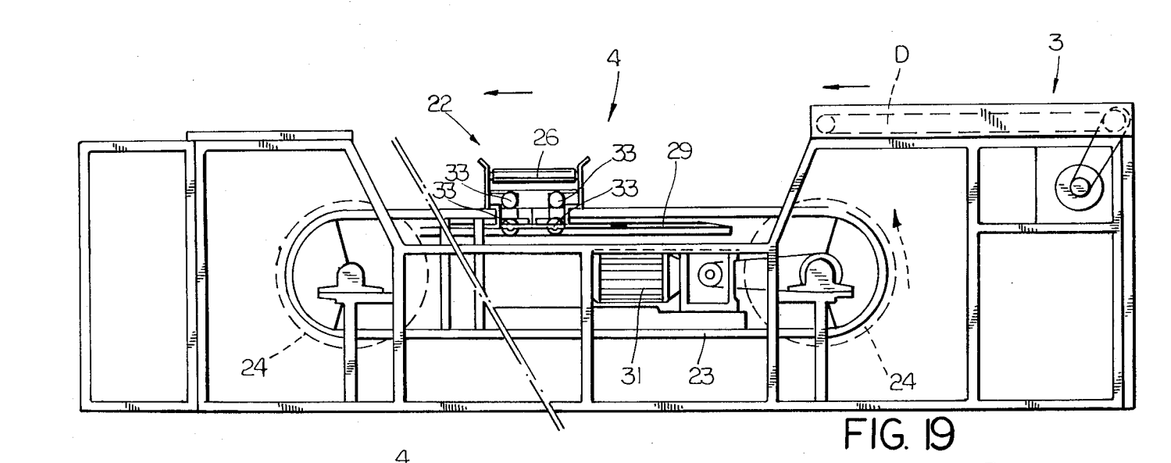
FIG. 19 is another side view of another portion of the sorting machine of FIG. 18, partly cut away.
Figure 20:
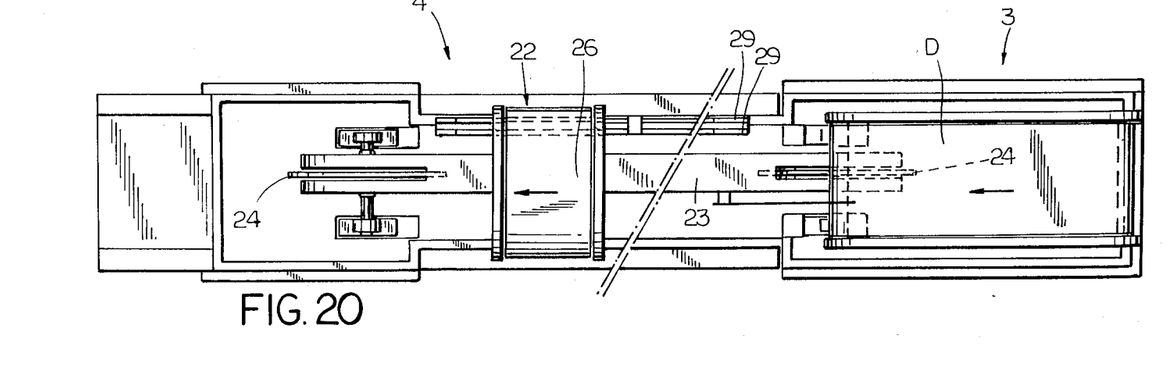
FIG. 20 is a top view of the portion of the sorting machine of FIG. 19.
Figure 21:
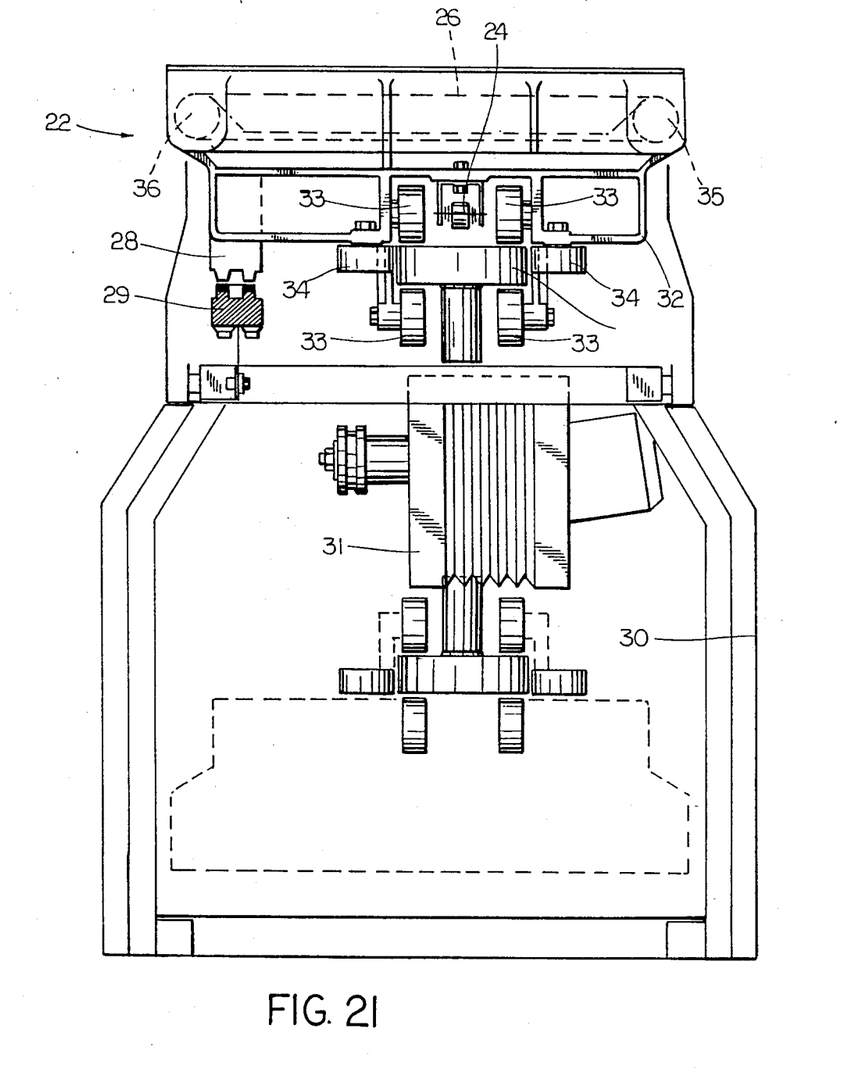
FIG. 21 is an end view of the portion of the sorting machine of FIG. 19.

The sorting machine at 4 includes a plurality of conveying devices 22 (see, especially, FIGS. 1 and 18–21) that are drawn along a fixed monorail 23 by a chain 24a (FIGS. 21). The chain is about and driven by toothed wheels 23 (FIGS. 18 to 20). An encoder 25 on one of the toothed wheels generates, on each revolution of the toothed wheel, a certain number of pulses, which are sent to the computer unit. The computer is thus informed, moment by moment, of the exact position of each conveying device. Each conveying device has a small rotary belt 26 having a planar upper, i.e. outermore, run and driven by a motor 27 on the conveying device. The motor is powered or fed through a pair of contacts 28 on the conveying device in sliding contact with parallel pairs of spaced feed rods 29 linked to a power supply (not shown), which is controlled, in turn, by the computer unit.

The feed rods 29 are not continuous, but consist of a plurality of separate sections respectively associated with unloading stations 29a. The sections of the feed rods are separated from one another by a layer of insulating material. Accordingly, each section of the feed rods 29 can feed power independently from the others.

In operation, therefore, an unloading-station destination code for each item to be sorted is keyed in by the operators of the push button panels 20 (FIG. 1).

Each coding operation also caused the computer unit to reserve a segment of the link belts at 2 for the corresponding item and, when this segment of the first link belt at 2 passes in front of the feeding apparatus, the relevant belt 5 of the feeding device is automatically driven to put the item on link belt in the segment.

From the series of link belts at 2, the items pass to the synchronizing device at 3 where they undergo consecutive accelerations and decelerations, as needed, so that they are synchronized perfectly with the conveying devices 22 on which they are laid down.

The encoder 25, which is connect with the dragging chain 24 a of carriages 22 via the toothed wheel 24 generates a high number of impulses for each revolution of the wheel so that the computer, counting these impulses, knows exactly the interval between the moment the coding operation has been effected and the moment the item arrives at the synchronization apparatus.

It is possible, therefore, to verify the displacement of each item on a conveying device 22. When a conveying device passes the hopper of the unloading station destined to receive a predetermined item, the computer energizes the feed rods 29 located thereat, and consequently, the motor 24 of the conveying device is set in motion, driving the belt 26 thereof, to unload the item.

FIGS. 18–21 show, for the sorting apparatus, a frame 30 supporting monorail 23, along which, pulled by the chain powered by electric motor 31 or by similar devices of a known type, travel the series of conveying devices at 22 or carriages.

Monorail 23 (FIG. 19) follows a closed path, which can be in a vertical plane, as shown in FIG. 18, or in a horizontal plane, or any variation in between. The monorail has a "T"-shaped cross-section.

Each carriage 22 includes frame 32 mounted on the monorail 23 by pairs of idle wheels 33 and 34. More specifically, there are four pairs of the idle wheels 33, which have horizontal axes, to rest on the horizontal member of the monorail 23 alternatively, dependinng on whether carriage 22 is above or below the monorail. Two pairs of idle wheels 34 which have vertical axes, serve to guide the carriage 22 along the monorail. This layout, using a single support rail, permits the carriages to move along even a winding path.

Each frame 32 carries between roller pair 35 and 36, a small rotary belt 26 which is movable in a direction at right angles to the feed direction of carriage 22. This small belt conveyor is powered by the electric motor 27 which is, preferably of the permanent magnet D.C. type.

The feed rod pairs 29 are fixedly installed along the path of monorail 23 at each unloading station. Each pair of feed rods is independent from the others, and extends approximately the entire length of the unloading station it is at. The motor 27 for driving small belt 26 of each carriage gets its power directly from these, using the pair of brushes or sliding contacts 28. The coding keyboard 20 sets controls so that, when each small rotary belt 26 passes by the unloading station preselected thereby, the respective feed rods thereat are fed with the voltage required to perform unloading.

Consequently, when each carriage 22 with its small belt 26 passes by a predetermined unloading station, the system can be regulated to select both the polarity and the voltage of the current that passes through feed rods 29 to the respective motors 27 which drive the small belts, causing them to rotate in one direction or the other, depending on the polarity selected, and at a preselected unloading speed depending on the voltage.

This makes it possible to exploit the special features offered by permanent magnet D.C. motors, permitting simple control of the substantial acceleration characteristics that distinguish this type of apparatus, so that, for example, the objects are unloaded onto belt conveyors (not shown) at approximately the same speed as that of the conveyors they fall on.

I do not limit myself to any particular details of construction set forth in the specification and illustrated in the accompanying drawings. The same may be modified within the scope of the appended claims without departing from the spirit and the scope of the invention.

I claim:

1. An apparatus for feeding, selecting and sorting items, comprising:
   a coding and feeding unit having a keyboard for keying in codes of respective unloading-station destinations of respective items thereat and means for conveying the items from the keyboard;
   a sorting machine comprising: a monorail of T-shaped cross section; a plurality of conveying devices for conveying respective items, each conveying device having at least two pairs of idle wheels with substantially horizontal axes supporting the conveying device on the monorail for movement in one direction therealong, at least one pair of idle wheels with substantially vertical axes for guiding the conveying device along the monorail in the one direction, a pair of rollers and a rotary belt thereabout for receiving the respective item of the conveying device and unloading the item by rotary movement of the belt transverse to the one direction, a permanent magnet D.C. electric motor for rotating the rotary belt, and a pair of slidable contacts connected to the motor; chain-like means for moving the conveying devices along the monorail in the one direction one after the other; and pairs of feed rods spacedly parallel to each other, the pairs of feed rods being spaced along the monorail for defining an unloading station at each pair of the feed rods therealong and spaced from the monorail for sliding contact with the slidable contacts of each conveying device as it moves therepast along the monorail in the one direction, whereby the feed bars at the respective unloading-station destinations of the respective items keyed in at the coding and feeding unit can be energized as the conveying devices with the respective items move therepast for unloading the items by the transverse rotation of the rotary belts thereof, the direction and speed of the unloading being controllable by the relative polarity and voltage of the energization of the feed bars; and
   a synchronizing unit for successively receiving the items from the coding and feeding unit and feeding the items respectively to the conveying devices, the synchronizing unit comprising three rotating belts positioned one after the other, the speed of the rotation of the three rotating belts being controllable independently of one another, whereby control of the speed of rotation thereof synchronizes the items fed to the sorting machine to the movement of the conveying devices of the sorting machine to the movement of the conveying devices of the sorting machine for respective receipt of the items thereby.

2. The apparatus of claim 1, wherein the chain-like means comprises a chain, at least two rotatable toothed wheels engaging the chain for moving the chain along the monorail upon rotationally driving either thereof and an electric motor for rotationally driving one of the toothed wheels, and further comprising an encoder operatively connected to one of the toothed wheels for producing a number of impulses for each rotation of the one toothed wheel, whereby the impulses are synchronized to the movement of the conveying devices for determining the positions thereof.

* * * * *